United States Patent Office 3,605,782
Patented Sept. 20, 1971

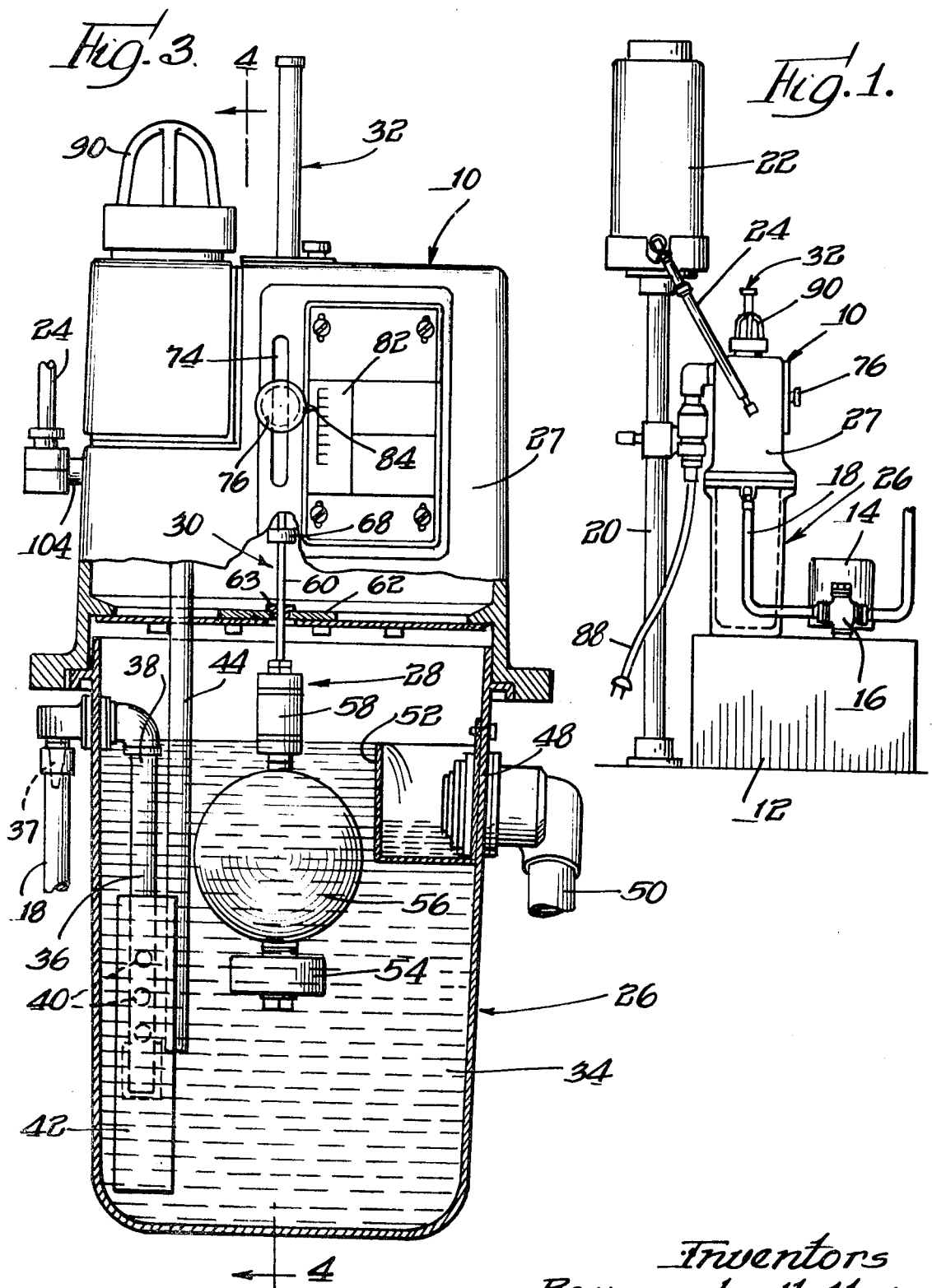

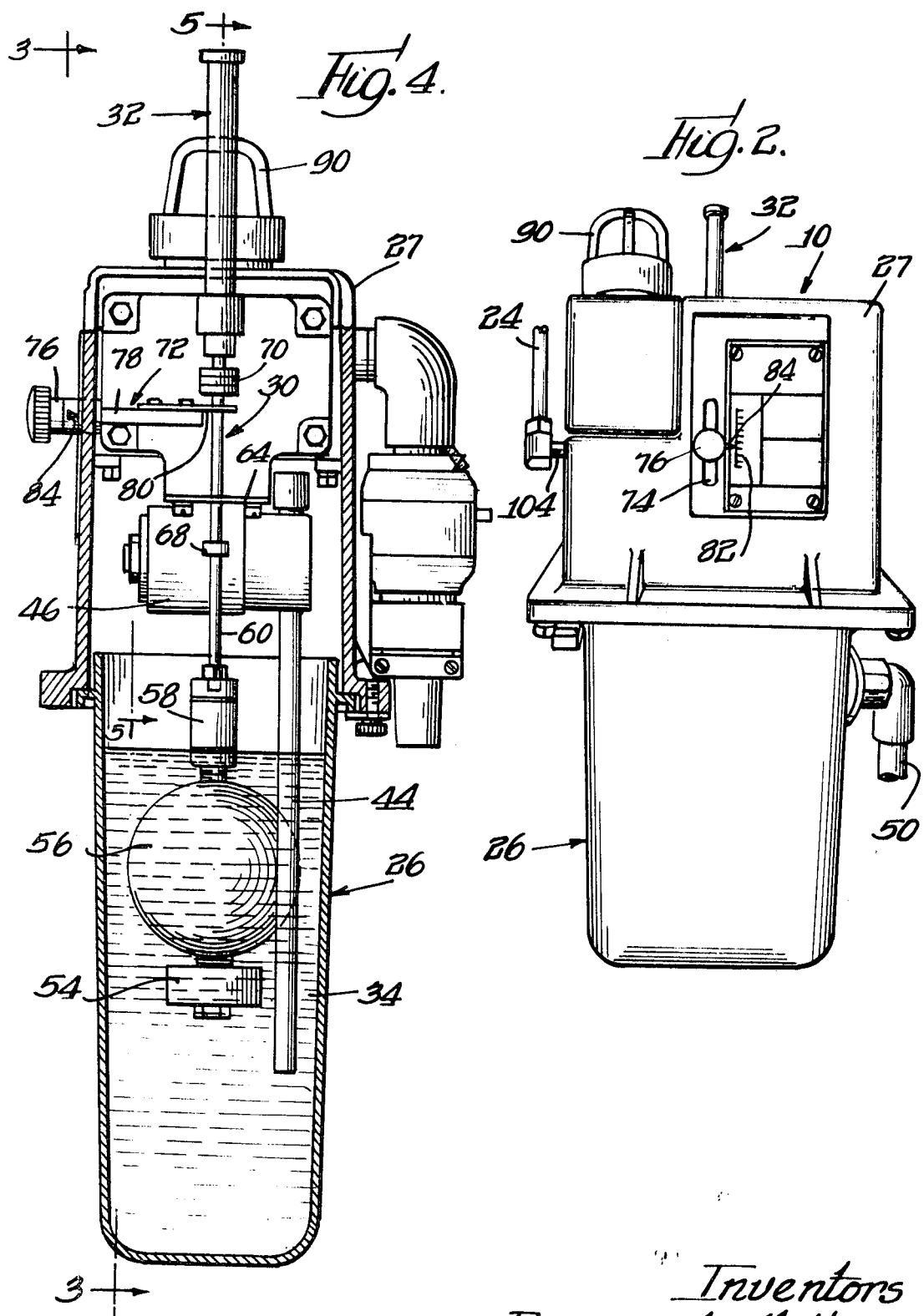

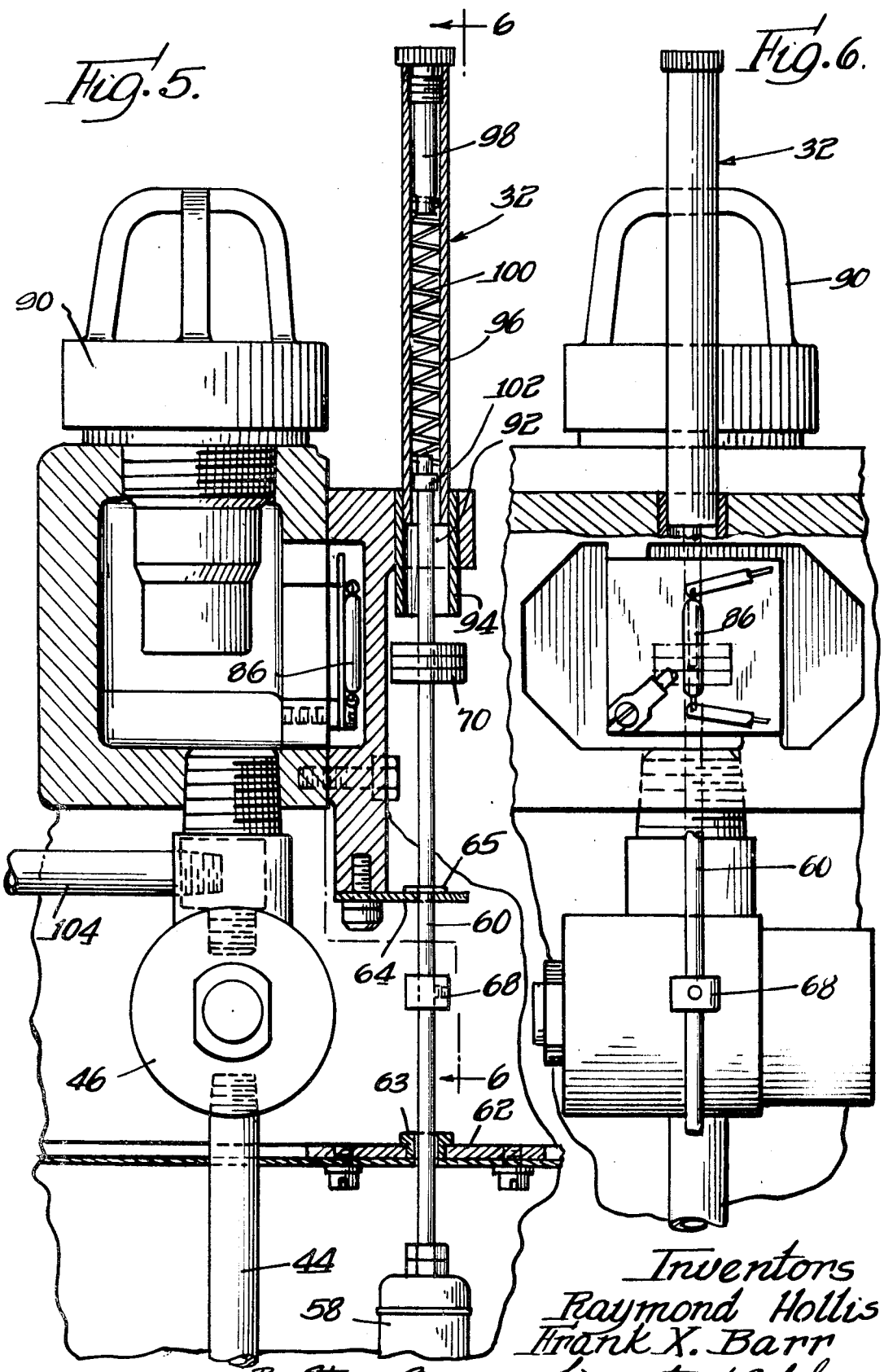

3,605,782
LIQUID MIXING DEVICE
Raymond Hollis, Park Ridge, and Frank X. Barr, Buffalo Grove, Ill., assignors to Graymills Corporation, Chicago, Ill.
Filed July 14, 1969, Ser. No. 841,243
Int. Cl. G05d *11/00;* B41l *27/00*
U.S. Cl. 137—91          6 Claims

ABSTRACT OF THE DISCLOSURE

A liquid mixing device for mixing and maintaining two or more liquids to a selected specific gravity of a mixture of the liquids including a tank for holding the mixture of liquids. A hydrometer is positioned in the tank, and the hydrometer is connected to a control device. The control device is in turn connected to a valve which controls the flow of one of the liquids into the tank holding the mixture of liquids, thereby regulating the specific gravity of the mixture in the tank by the addition of one of the liquids.

---

In the printing art, and especially in lithography, it is necessary to provide a mixture of alcohol and water to rolls which are used in printing. Alcohol, being more volatile than water, normally evaporates from the fountains which are mounted adjacent to the rolls, and also evaporates from the surface of the rolls so that the volume of alcohol in proportion to the volume of water steadily diminishes as the mixture is being used. In more advanced presses, the alcohol-water mixture is circulated through the fountains for various and sundry reasons, such as cooling the alcohol-water mixture and removal of foreign particles from the mixture.

It has been the practice of printers to test the specific gravity of the alcohol-water mixture periodically and to add a desired quantity of alcohol to the mixture to replace the alcohol that has evaporated. Periodic testing of the alcohol-water mixture is time-consuming, and the periodic testing results in varying proportions of alcohol and water during the course of a printing job. It may be appreciated that testing which is dependent upon human memory often results in tests being made at varying time intervals. It follows that there may be a substantial loss of alcohol before the loss is detected. The remedy is to add a sufficiently large quantity of alcohol to bring the mixture to proper proportions. This action results in having a wide fluctuation in the amount of alcohol in the mixture, thereby affecting the quality of printing. As greater uniformity of quality of printing is demanded, it is found that the intervals of testing must be increased. The ultimate in desirability is to have constant testing of the alcohol-water mixture with a constant addition of alcohol to replace the alcohol which evaporates.

SUMMARY OF THE INVENTION

The present invention relates to a liquid mixing device which continuously measures the proportions of two liquids and adds one of the liquids to the mixture as it is required. More specifically, the present device is particularly adapted for use in the printing industry for continuously measuring the proportions of alcohol and water in an alcohol-water mixture. The device also adds alcohol to the mixture in order to maintain the proportion of alcohol and water to a selected proportion. Fundamentally, the device operates on the principal that alcohol evaporates from the alcohol-water mixture more rapidly than water so that if it is desired to reduce the proportion of alcohol in the alcohol-water mixture, the evaporation of alcohol will reduce the proportion of alcohol. The device automatically adds alcohol to the alcohol-water mixture as is needed in order to maintain a desired amount of alcohol in the alcohol-water mixture; or, if it is required to increase the amount of alcohol in the alcohol-water mixture, then additional alcohol is added.

The liquid mixing device is connected to a constant flow of an alcohol-water mixture, and continuously a sample of the flow is diverted to a tank wherein the specific gravity of the alcohol-water mixture is measured by a hydrometer. In the event that the specific gravity of the alcohol-water mixture is too high, alcohol is added to the mixture.

Addition of alcohol to the alcohol-water mixture is controlled by a magnet in cooperation with a sensing switch, so that there is no mechanical interconnection between the hydrometer and the sensing switch to affect the operation and sensitivity of the hydrometer. The sensing switch controls a solenoid valve through a well-known electrical circuitry. The addition of alcohol is in no way affected by the pressure of the alcohol, and the system operates continuously.

The device also provides a method of adjustment so that the proportion of alcohol in the alcohol-water mixture may be adjusted, as was mentioned above. If it is desired to decrease the amount of alcohol in the alcohol-water mixture, the alcohol which is lost by evaporation at the fountains is not replaced so that there is a reduction in the proportion of alcohol. However, when the proper proportion is reached and there is a further loss of alcohol in the alcohol-water mixture, the amount of alcohol which is lost below that which is required is replenished in the instant device. However, when it is required that the alcohol-water mixture be adjusted so that the amount of alcohol be increased, the device allows an additional amount of alcohol to flow into the system until the proper level of alcohol is reached in the mixture.

BRIEF DESCRIPTION OF THE DRAWINGS

FIG. 1 is a side elevation showing a liquid mixing device embodying the present invention connected to a source of a liquid mixture and connected to a container for holding one of the components of the liquid mixture;

FIG. 2 is a front elevation of the liquid mixing device shown in FIG. 1;

FIG. 3 is an enlarged front elevation of the device shown in FIG. 2 but showing a portion of the device broken away to show a portion of the device in cross-section;

FIG. 4 is a cross-sectional view taken on line 4—4 of FIG. 3;

FIG. 5 is an enlarged fragmentary cross-section taken on line 5—5 of FIG. 4; and FIG. 6 is an enlarged fragmentary cross-section taken on line 6—6 of FIG. 5.

DESCRIPTION OF THE PREFERRED EMBODIMENTS

Referring now to the drawings and especially to FIG. 1, a liquid mixing device generally indicated by numeral 10 is shown therein and is shown mounted on top of a reservoir tank 12, which tank is connected to a pump 14 through a three-way fitting 16. The pump is connected to a fountain system of a printing press which is not shown herein. The device 10 is connected to the fitting 16 through tubing 18. Standing adjacent to the device 10 is a post 20 which has mounted thereon a container 22 for holding a supply of alcohol, which container is connected to the device 10 through tubing 24.

As may be best seen in FIGS. 3 and 4, the liquid mixing device 10 generally consists of a mixing chamber 26, a housing 27 mounted on top of the mixing chamber 26, a hydrometer assembly 28 mounted in the mixing chamber, a control assembly 30 mounted in housing 27 and connected to the hydrometer, and an adjustment tool 32 removably engageably mounted in housing 27 above a portion of the control assembly.

The mixing chamber includes a mixing tank 34 which receives a mixture of alcohol and water from the tank 12. A tank inlet 36 is connected to tubing 18 through an orifice 37 which limits the volume of mixture flowing into the tank. The tank inlet includes a pipe 38 having a plurality of apertures 40 which are positioned adjacent to a baffle 42. An alcohol inlet pipe 44 extends into the tank 34; and, as may be seen in FIG. 5, the alcohol inlet pipe is connected to a conventional solenoid valve 46. The tank 34 includes an outlet 48 which is connected to a discharge pipe 50, which returns the alcohol-water mixture into the system for circulation through fountains and other equipment which is not shown herein since it is well-known in the art. Positioned adjacent to the outlet 48 is an overflow cup 52 which determines a constant level of the alcohol-water mixture in the tank. It may be readily appreciated that as the alcohol-water mixture flows into the tank through the tank inlet 36, the alcohol-water mixture flows out of the tank by spilling over the edge of the overflow cup 52 and the level of liquid in the tank remains substantially constant.

The hydrometer assembly 28 includes a bottom weight 54 with a primary float 56 connected to and positioned above the weight. A secondary float 58 is connected to and positioned above the primary float 56. In a given specific situation, the secondary float allows a 30% variance in specific gravity of the alcohol-water mixture to be translated to a one and one-sixteenth inch vertical movement in the hydrometer assembly 28.

The control assembly 30 is connected to the hydrometer 28 through a control column 60, which column has its lower end fixed to the secondary float. The control column extends upward into housing 27, which housing includes a floor 62 with an apertured floor bushing 63 positioned therein and the column 60 is movably mounted in the bushing 63 and guided thereby. As may be best seen in FIG. 5, a bench 64 is fixed to the housing with a Teflon bushing 65 extending through the bench and slideably receiving the column 60. It may be seen that the bushings 63 and 65 serve as guides for the column to keep the column vertical and to keep the hydrometer assembly in position. The control column has a stop collar 68 fixed thereon in order to limit the vertical movement of the control column for reasons which will become apparent hereinafter. The control column has a disc magnet 70 slideably mounted on the control column for reasons which will become apparent hereinafter.

The control assembly 30 also includes an adjustment assembly 72 movably mounted on the housing 27. The housing includes a slot 74 through which extends a portion of the adjustment assembly. An internally-threaded adjustment knob 76 constitutes a part of the adjustment assembly 72 for selectively locking the adjustment assembly in position in the slot 74. The adjustment assembly includes a beam 78 which has mounted thereon a fork 80 which straddles the control column 60 and is engageable with the magnet 70, as will be described in detail hereinafter. An indicator plate 82 is mounted on the housing 27, and the indicator plate contains indicia for indicating proportions of alcohol and water. The indicator plate is calibrated in relation to the hydrometer assembly and is positioned on the housing in relation to the level of liquid in the mixing tank 34 as determined by the height of the overflow cup 52 as well as the positions of other elements of the control assembly. A pointer 84 is a part of the adjustment assembly, which pointer moves with the beam 78 and adjustment knob 76 so that the pointer cooperates with the indicator plate 82 to indicate a selected proportion of alcohol and water.

The control assembly includes an electrical switching arrangement for operating the solenoid valve 46, and parts of this assembly may be best seen in FIG. 5. Positioned within the housing 27 adjacent to the control column 60 and in the vicinity of the magnet 70 is a reed switch 86 which is connected to a suitable source of electrical current through leads 88. The reed switch 86 is also connected to the valve 46 and a conventional indicator lamp, which is not shown herein and is mounted in a lamp housing 90. The electrical connections between the reed switch, lamp and solenoid valve are well-known and are not shown in detail herein.

The adjustment tool 32 is slideably received in a tube aperture 92 of sleeve 94, which sleeve is positioned in the housing 27. The adjustment tool includes a tube 96 with a stop 98 fixed in its upper end. A compression spring 100 is mounted in the tube 96 and is engageable with a spring collar 102 which is engageable with the upper end of the control column 60.

The valve 46 is connected to an alcohol tube 104 which is connected to the tube 24 and thus to the container 22. The container 22 holds a supply of alcohol for delivering alcohol to the mixing tank as needed.

A preferred embodiment of the instant invention is shown and described as liquid mixing device 10. One particular use of the device 10 is in maintaining a prescribed proportion of alcohol and water in a lithographic printing operation. As is well-known, lithographers utilize a mixture of alcohol and water on certain rolls; and the alcohol-water mixture is delivered to fountains in which certain rolls rotate so that alcohol-water is picked up on certain rolls. The alcohol-water mixture is circulated in order to cool the alcohol-water mixture and to remove impurities which are picked up during the use of the alcohol-water mixture. The circulatory pump is pump 14, and the reservoir for the alcohol-water mixture is tank 12. As may be seen in FIG. 1, a portion of the alcohol-water mixture is delivered to the device 10 through tubing 18; and the alcohol-water mixture is delivered into the mixing tank 34 through tank inlet 36. Although a single tank is shown, the present device may be used with more than one tank by the addition of a valve to divert the flow from two or more tanks to the instant device and have intermittent sampling and adjustment of the alcohol-water mixture in each of the tanks. It is important to note that the construction of the tank inlet is such that there is a minimum of turbulence created in the mixing tank 34 and that the orifice 37 limits the volume of flow to allow the other parts of the device to react and make a correction if needed. As the alcohol-water mixture is delivered to the mixing tank, a portion of the alcohol-water mixture spills over the edge of the overflow cup 52 and out through outlet 48 along the discharge pipe 50. It is important to note that the level in the mixing tank 34 is kept constant by the utilization of the overflow cup 52.

When the alcohol in the alcohol-water mixture evaporates, additional alcohol is added. It may be appreciated that as the alcohol-water mixture loses its alcohol, the specific gravity of the mixture increases so that the hydrometer rises, thereby pushing up the control column 60, which also moves the magnet 70 relative to the reed switch 86. The movement of the magnet 70 relative to the reed swich 86 operates the reed switch, and thereby opens the valve 46, which allows alcohol from container 22 to flow through tube 24 into the mixing tank 34. Although a gravity feed container 22 is shown as the source of the alcohol, it may be appreciated that the present construction lends itself to attachment to a source of alcohol from which the alcohol is pumped at a relatively high pressure since the flow of alcohol is controlled by solenoid valve 46. It should be noted that alcohol inlet tube 44 extends down toward the bottom of the tank and also does not create any turbulence within the tank when alcohol is being added. It should further be noted that the lamp in the indicator lamp housing lights up so that an operator may observe that alcohol is being added to the mixture. When the specific gravity of the alcohol-water mixture is sufficiently reduced, the hydrometer sinks into the liquid, the control column also sinks, carrying with it the magnet so that the valve 46 is closed by the action of the reed switch 86, thereby interrupting the flow of alcohol into the mixing tank, and, of course, the lamp is extinguished.

It may be appreciated that the construction of the instant device allows the alcohol to come from any suitable source in view of the fact that the valve 46 is in no way dependent in operation upon the pressure of the liquid; and the operation of the control system is dependent solely upon the specific gravity of the alcohol-water mixture.

In order to change the desired proportions of alcohol and water in the system, it is only necessary to adjust the position of the magnet 70 on the control column 60 so that a different specific gravity is utilized to activate the switch 86 and thereby open the valve 46. In order to adjust the position of the magnet 70 along the control column 60, the knob 76 is loosened and the indicator 84 is positioned adjacent to a selected proportion as shown on indicator plate 82. Movement of the indicator also moves with it the beam 78 and the fork 80. The adjustment tool is then placed in the aperture 92 of the sleeve 94 so that the spring collar 102 engages the control column. The tool is then pressed downward until the stop collar 68 engages floor 62.

In the event that the magnet 70 is to be raised along the column 60, this is accomplished by the magnet 70 engaging the fork 80, which acts as a magnet-positioning device; and, as the column 60 is being pushed downward by the spring 100 in engagement with spring collar 102 toward the engagement of the stop-collar 68 with the floor 62, which acts as a stop means, the magnet slides up along the column 60 since the column is being pushed down through the magnet. It is important to note that the foce required to compress spring 100 is less than the holding force between the magnet 70 and column 60. On the other hand, if the magnet 70 is to be lowered, the control column 60 is pushed down until the stop collar 68 engages the floor 62 and the magnet 70 is pushed down along the control column by tube 96 of the adjustment tool until the magnet engages the fork 80, thereby positioning the magnet in a lower position. After the magnet 70 is moved along the control column 60 to its selected position, the adjustment tool 32 is removed so that the buoyancy of the hydrometer assembly 28 rises the stop collar 68 from engagement with the floor 62. Thereby, the hydrometer is free to rise and fall with the specific gravity of the alcohol-water mixture. The operation of the device is then as has been heretofore described.

From the foregoing discussion, it may be readily seen that the operation of the device is quite simple in that the operator need only adjust the position of the indicator 84 relative to the indicator plate 82, insert the adjustment tool 32, push down, and the adjustment is thereby made. Thereafter, the mixing device will maintain the proper proportions of alcohol and water by adding alcohol to the alcohol-water mixture in order to replenish any alcohol which is lost due to evaporation during the normal operation of the printing system.

Although the preferred embodiment has been disclosed in terms of a liquid mixing device for alcohol and water, it may be readily appreciated that those skilled in the art may utilize the instant invention for mixing any two liquids in which one liquid is more volatile than its companon liquid. It is to be understood that the hereinabove-described specific embodiment is described in detail in accordance with the Patent Act of 1952 to make a complete and accurate description of a preferred embodiment to those skilled in the art, but is intended in no way to limit the invention.

What is claimed is:

1. A liquid mixing device for controlling the addition of a liquid to a mixture of two or more liquids whose combined specific gravity varies, comprising a tank for holding the mixture of liquids, means in said device for setting a selected specific gravity for the mixture of liquids in the tank, means for maintaining a constant level of the two liquids in the tank, a free-floating hydrometer movable vertically depending upon the combined specific gravity of the liquids in the tank, a column mounted on the top of the hydrometer so that the column may move vertically responsive to hydrometer movement, a magnet mounted on the column, guide means for holding the column and magnet in a vertical path, a switch in an electric circuit mounted adjacent to the column and actuable to a closed condition by the approach of the magnet to a position adjacent the switch, a valve in said circuit operable by the closing of the switch, said valve opening or closing a flow of one of the liquids into the tank.

2. A liquid mixing device as defined in claim 1 including a stop collar fixed to said column and an adjustment tube removably mounted on said column and engageable with the magnet to move the magnet along said column.

3. A liquid mixing device as defined in claim 2 including a spring in said adjustment tube connectable with one end of the column and the load required to compress the spring being greater than the holding force between the magnet and the column.

4. A liquid mixing device as defined in claim 2, including an overflow outlet mounted in said tank comprising the said means for maintaining a constant level of mixture of liquids in said tank, and a spring positioned in said adjustment tube engageable with one end of the column and the load required to compress the spring being greater than the holding force between the magnet and the column.

5. A liquid mixing device as defined in claim 1, including an overflow outlet mounted in said tank comprising the said means for maintaining a constant level of mixture of liquids in the tank.

6. A liquid mixing device for controlling the addition of alcohol to a mixture of alcohol and water to a selected specific gravity of the mixture comprising, in combination, a tank for holding the mixture of alcohol and water, means for adding alcohol to said tank, means for adding a mixture of alcohol and water to said tank, an overflow outlet mounted in said tank to maintain a constant level of the mixture in the tank, a hydrometer positioned in the tank to determine the specific gravity of the mixture, a solenoid valve controlling the flow of alcohol into the mixture from a source, a column connected to the hydrometer, a magnet movably mounted on the column, a switch positioned adjacent to the column and affected by said magnet when the magnet is juxtaposed the switch, said switch being electrically connected to the solenoid valve to control the flow of the alcohol into the tank, a magnet-positioning device juxtaposed the column and being selectively engageable with the magnet, said magnet-positioning device being connected to an indicator, an indicator plate positioned adjacent to the indicator carrying indicia thereon for indicating the proportions of alcohol and water in the tank, a stop collar fixed to said column, stop means engageable with the stop collar to limit movement of the column in one direction, an adjustment tube mounted along an axis common with the longitudinal axis of said column, and a spring in said adjustment tube connectable with one end of the column and load required to compress the spring being greater than the holding force between the magnet and the column.

References Cited

UNITED STATES PATENTS

| | | | |
|---|---|---|---|
| 1,664,840 | 4/1928 | Wermine | 137—91 |
| Re. 17,728 | 7/1930 | Burningham et al. | 73—452 |
| 2,226,954 | 12/1940 | Thorold | 137—91 |
| 2,320,720 | 6/1943 | Croft | 137—91X |
| 3,089,502 | 5/1963 | Davidson et al. | 73—453X |
| 3,485,257 | 12/1969 | Gegenheimer et al. | 137—91 |
| 2,727,392 | 12/1955 | Hazard et al. | 73—453X |

LAVERNE D. GEIGER, Primary Examiner

D. J. ZOBKIW, Assistant Examiner

U.S. Cl. X.R.

73—445; 137—412